Nov. 21, 1967   I. M. KASSER ET AL   3,354,141
METHOD FOR PREPARING VISCOSE SPINNING SOLUTION
Filed Feb. 6, 1964   2 Sheets-Sheet 1

INVENTORS
Ivan Michael Kasser
Alexander Kasser
BY Charles J. Eldukin
ATTORNEY

3,354,141
METHOD FOR PREPARING VISCOSE SPINNING SOLUTION
Ivan Michael Kasser and Alexander Kasser, both of 159 Gates Ave., Montclair, N.J. 07042
Filed Feb. 6, 1964, Ser. No. 342,956
3 Claims. (Cl. 260—217)

ABSTRACT OF THE DISCLOSURE

A grain parchment is pulped through an acid pretreatment step, a brief digestion step and a multi-stage chlorine bleaching step producing an undegraded pulp from and hither to unpulpable raw material, that is a grain parchment, which is further steepable and pressable, macerateable and xanthatable to produce an undegraded product as a viscose without the conventional aging step.

---

This invention relates to the production of quality pulp and pulp products from heretofore unusable, micro-celled raw materials. More particularly, the invention relates to a method for utilizing micro-cellular materials such as coffee parchment, rice parchment and corn parchment for the economic production of cellulosic pulp, nitrocellulose, cellulose esters, cellulose ethers and viscose solutions for producing cellophane, rayon fiber, cord and the like.

Materials which have classically been selected for producing quality pulp have been selected on the basis of their yield of alpha-cellulose as well as the length of their fibers. These include seed hairs (cotton), stem fibers (linen, jute), leaf fibers (straw, esparto), fruit fibers (coconut) and wood fibers. A second criterion for raw materials has been the content of lignins and pentosans which, if excessive, raises processing costs and lowers yield, thereby making the use of such materials uneconomic. Additionally, processing of these materials to remove lignins and pentosans results in degradation of the cellulosic chains.

It is a principal feature of the present invention that satisfactory celulosic products can be produced economically from certain materials which fail on both of the above criteria.

The term "parchment," as applied herein, means the material covering the grains of coffee, rice, corn and the like. Coffee parchment, which is a by-product isolated during the process of coffee production, is a material typical of those this invention utilizes. It has been used in fertilizers, mixed in cattle feed, as a substitute for chicory and as a possible ion exchange material, but has not proved more than marginally successful in any of these applications. It can be used as a combustible, but is considered as a nuisance to coffee producers, who often have to burn great collected amounts without recovering the heat of combustion.

Parchment is composed of very short cellular material, averaging less than 500 microns in length, and which is generically called "microcelled" herein. To take an example, the coffee bean parchment is composed mainly of sclerular cells, the average length of which is 380 microns. These materials, having very high lignin and pentosan contents, have never been treated to make useful cellulosic pulps or pulp derivatives.

When parchment cells are isolated they are found to be stiff, straight and highly irregular with protrusions. In contrast, the cells of woody cellulosic material used industrially are at least twice as long, usually more than four to seven times as long, have many bends, are elastic and rarely have irregular protrusions, thus offering a possibility of intertwining and greater interaction between the cells (fibers).

As noted hereinabove, the high percentage of lignin and pentosans in these parchments prevented the preparation of useful cellulosic pulps by known methods and, thus, the industrial exploitation of these materials. The elimination of lignin and pentosans from the micro-cells, the main structural unit of the parchment material, was too complicated without excessive degradation of the celulose chains, and in any event resulted in a prohibitively low yield on raw material treated.

It is accordingly an object of the present invention to provide an economic process for the treatment of micro-celled materials to produce useful cellulosic products.

A further object of the invention is to provide a process for making useful cellulose, nitrocellulose, cellulose ethers and esters and viscose solutions from parchment materials.

A still further object of the invention is to provide an economic use for waste products such as coffee, rice and corn parchment.

These and other objects and advantages will appear from the following description of several embodiments of the invention, and the novel features will be particularly pointed out in connection with the appended claims.

The process of the invention eliminates lignin and pentosans from micro-cellular parchment material without excessive degradation of the cellulose chains, and at the same time an industrially acceptable yield of pulp is maintained. Pulp produced according to the invention can be further treated, by new procedures, to produce a viscose from which rayon cord and fiber and cellophane of unusually good quality can be made.

The process of the invention is the result of an intensive study of the mechanical, physico-chemical and chemical properties of parchment, and a proper understanding of the invention requires some attention to these properties. Understanding will be further aided by referring to the attached drawings, wherein.

Figure 1:
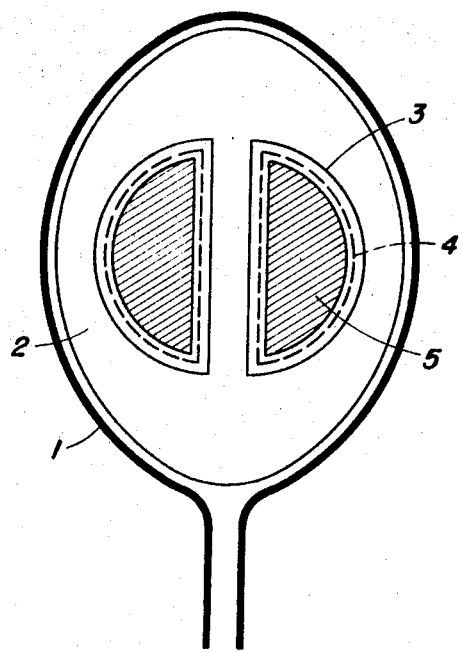
FIGURE 1 is a schematic illustration of the coffee fruit or bean showing the component parts thereof.

With reference to FIGURE 1, it is seen that the coffee fruit includes the exocarp 1, mesocarp 2, parchment 3 (also called endocarp), the silver skin or tegument 4 composed of scleral cells and parenchymatic cells, and the albumen or grain 5.

Figure 2A:
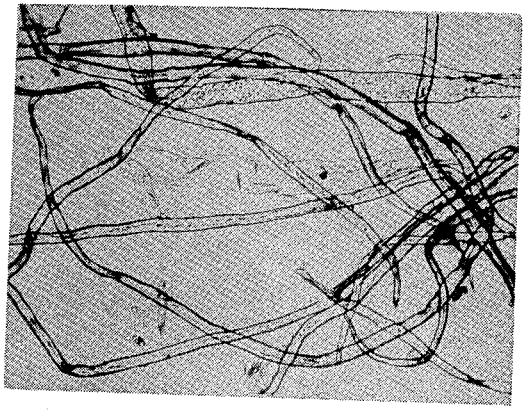
FIGURES 2a and 2b are photomicrographs (125X) showing (a) hard wood cells and (b) coffee parchment cells.
Figure 2B:
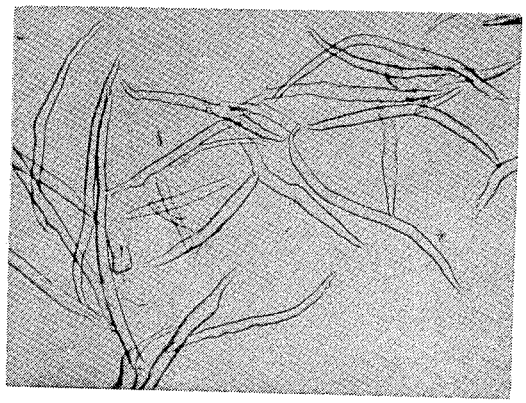
Figure 3:
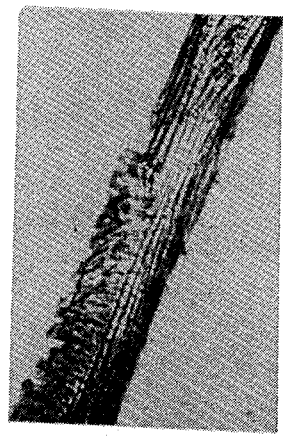
FIGURE 3 is a photomicrograph (110X) of a coffee parchment in transverse section.

Mechanical properties of parchments which are pertinent include the following: raw parchment has a thickness of from 100 to 300 microns, and is shown in FIGURE 3. Often the silver skin separates with the endocarp upon coffee processing. The cells of both the silver skin and the endocarp are short, stiff and irregular, as can be seen in FIGURE 2b.

Figure 4:
FIGURE 4 is a photomicrograph (110X) of the face side of coffee parchment.

The principal physico-chemical property of interest is the very high density of the cells in parchments and the prevalent intercrossing of the cells, at least when compared to woody or annual plants, as shown in FIGURE 4.

Chemically, the significant properties are the aforementionel large proportions of lignin and pentosans; it is to be noted that an abnormally large fraction of these materials are extremely resistant to the standard chemical elimination treatments, and such treatments tended to degrade the cellulose.

While the process of the invention will vary some-what depending on the particular characteristics of the material being treated, the process involves three stages: an acid treatment, an alkali treatment and bleaching. In the first stage, an unusually high percentage of sulfuric acid (1–2%) with respect to parchment is employed. The second stage is a short (15–30 minutes) batch treatment with a low percentage (12–18%) of alkali and high sulfidity (30–40%). Bleaching is multistage, usually 5–9 times, with 40 to 60% of chlorine consumed in the form of chlorine dioxide, to penetrate the very dense cell walls. Before the last chlorine dioxide stage, the pulp is purified with concentrated sodium hydroxide solution at about 20° C.

It is believed that a more complete understanding of the invention will be gained by referring to the following specific examples wherein the complete treatment of coffee bean parchment is set forth. It is to be understood that these examples are illustrative only and are not intended in a limiting sense. In particular, those skilled in the art will recognize that minor variations of treatment will be required when the composition of the parchment varies from the illustrated material, or when corn or rice parchment is used.

*Example I*

The coffee bean parchment employed had an average cell length of 380 microns. Pentosan content was 27% and lignin content was 26.3%.

Under conditions where practically all of the noncellulosic carbohydrates are retained, i.e. holocellulose, analysis showed 72.5%. So called Cross and Bevan cellulose, wherein a very small quantity of pentosans as well as noncellulosic hexosans are retained, was 54%.

Processing of this parchment was carried out in three stages; pretreatment, digestion and bleaching, as follows:

A concentration of 1.2% $H_2SO_4$ with respect to raw material was employed in the pretreatment, the liquid-solid ratio being 6:1. This step lasted 1½ hours and temperature was controlled at about 150° C. Washing was then carried out on a 300 mesh filter.

Digestion was performed with 18% alkali and 33% sulfidity, utilizing conventional reagents, with a liquid-solid ratio of 4.5:1 for 30 minutes at 165° C. Again, this was followed by washing on a 300 mesh filter.

Bleaching was carried out in six stages, and the conditions for each stage were as follows:

(a) *Chlorine water*

Concentration _____ 3.0% chlorine with respect to pulp (45% of total chlorine needed).
Duration _____ 2 hours.
Temperature _____ Room temperature.
Consistency _____ 3%.

(b) *Sodium hydroxide extraction*

Concentration _____ 2% NaOH with respect to pulp.
Duration _____ 60 minutes.
Temperature _____ 50° C.
Consistency _____ 5%.

(c) *Sodium hypochlorite*

Concentration _____ 1% hypochlorite (15% of total chlorine needed).
Duration _____ 2 hours.
Temperature _____ 38° C.
Consistency _____ 3%.

(d) *Caustic purification*

Concentration _____ 150% NaOH with respect to pulp.
Duration _____ 60 minutes.
Temperature _____ 20° C.
Consistency _____ 5%.

(e) *Chlorine dioxide*

Concentration _____ 2.8% chlorine dioxide (40% of total chlorine needed).
Duration _____ 4 hours.
Temperature _____ 70° C.
Consistency _____ 5%.

(f) *Sulfur dioxide*

Concentration _____ 1% $SO_2$ with respect to pulp.
Duration _____ 30 minutes.
Temperature _____ Room temperature.
Consistency _____ 3%.

Bleaching was followed by deionized water washing.

The pulp thus obtained had the following analytical properties:

Yield=33%
Alpha cellulose=98%
Lignin=0.1%
Pentosans=1.8%
D.P.=633
Brightness=89 photovolt
Ash=0.13%

This pulp was then dried in the atmosphere. It was used successfully to prepare carboxymethylcellulose, nitrocellulose and other cellulose derivatives.

*Example II*

An important aspect of the present invention is the fact that pulp prepared as in Example I may be used for making viscose solution for rayon fiber. Moreover, it was found that the conventional aging step could be entirely eliminated. The procedures employed were, in brief, steeping in a 220 grams per liter solution, pressing using a press ratio of 2.88 (ratio of alkali cellulose to alpha cellulose), and maceration for a short time (10 to 15 minutes as opposed to 30 to 120 minutes conventionally employed). During maceration, the alkali-cellulose is cooled down to 5°–8° C. (as opposed to normal-heating to 25°–30° or even higher). It is to be noted that a substantial portion of the maceration time is used for mixing the alkali-cellulose, which shows a strong tendency to agglomerate and gelify. No aging was required (this normally takes 4–24 hours).

The complete processing conditions and results are summarized hereinbelow:

(1) *Steeping*

Concentration _____ 220 grams/liter.
Duration _____ 30 minutes.
Temperature _____ Room temperature.
Consistency _____ 5%.

(2) *Pressing*

Pressing ratio of 2.88.

(3) *Maceration*

Duration _____ 15 minutes.
Temperature _____ 6° Centigrade.

(4) *Aging*

Eliminated.

(5) *Xanthation*

Concentration _____ 40% $CS_2$ with respect to cellulose.
Vacuum _____ 10 millimeters.
Duration _____ 3 hours.
Temperature _____ 29° Centigrade.

(6) *Mixing*

Composition of viscose solution _____ 6.25% cellulose, 6% sodium hydroxide.
Duration _____ 4 hours.
Temperature _____ 5° Centigrade.

(7) *Filtration*

Through standard linen and linters filters under constant pressure of 2.4 atmospheres.

(8) *Degassing of the viscose solution*

(9) *Ripening*

Duration _____ hours __ 48
Temperature _____ ° C __ 20

(10) *Preparation of rayon cord*

Using standard Muller bath to coagulate, followed by desulfurisation, oiling (ensimation against static) and drying of the spun cord. The cord was then given 150 twists/meter, then tested in comparison with rayon cord which was prepared from a high grade commercial dissolving pulp (hardwood dissolving pulp containing 98% alpha cellulose used in normal production of tire cord). The parchment pulp was treated simultaneously with this commercial pulp, and with the usual commercial method, except that for the parchment pulp maceration was limited to 15 minutes at 6° C. and aging was eliminated. Neither viscose contained any additives before spinning in order that a precise comparison could be made.

The comparative characteristics were as follows:

|  | From parchment pulp (1) | From high grade commercial dissolving pulp (2) |
|---|---|---|
| (a) Viscose and spinning: | | |
| Filtrability KF (FaChemFa method), percent | 85 | 80 |
| Viscosity at 20° C., poise | 132 | 135 |
| Number strands in cord | 272 | 272 |
| Stretch during spinning, percent | 85 | 86 |
| Tension during spinning, gm | 315 | 325 |
| (b) Final cord (all tests done on individual strands): | | |
| Twists/meter | 150 | 150 |
| Deniers per strand (gm./9,000 m./strand) | 1.50 | 1.50 |
| Tensile strength (gm./denier) (dried and conditioned, —20° C. 65% hum.) | 5.1 | 5.0 |
| Elongation per strand, percent | 23.3 | 24.0 |
| Dried conditioned rewetted: | | |
| Tensile strength, gm./denier | 4.6 | 4.2 |
| Elongation, percent | 27.4 | 26.2 |
| Mechanical coefficient (tensile×9 gm./denier× $\sqrt{\text{elongation}}$) | 217 | 194 |
| Ratio of wetted to dry tensile | 0.90 | 0.84 |

The relatively small loss of strength of the wetted cord strands of coffee parchment, compared to the commercial strands tested, is of important commercial significance, indicating that it is better suited for use under humid and wet conditions than cords presently used.

The filament prepared from coffee parchment dissolving pulp retained its integrity better upon unwinding than that prepared from the standard high grade pulp, which lost strands easily when unwound.

*Example III*

A viscose was prepared in the conditions of Example II from coffee parchment dissolving pulp. This viscose was allowed to ripen for 96 hours, together with a standard viscose from commercial dissolving pulp. The viscoses were coagulated in the form of thin cellophane sheets in standard coagulating baths, and then desulfurised, coated and dried on a hot calender-like surface. The cellophanes obtained from the two viscoses were comparable in clearness, glossiness, hand and strength, and also comparable to the best quality cellophanes.

*Example IV*

The procedures of Example I were repeated, employing (a) corn parchment and (b) rice parchment. In each case the pulp produced was comparable to that of Example I.

It will be understood that various changes in the details, materials, steps and arrangements of parts, which have been herein described and illustrated in order to explain the nature of the invention, may be made by those skilled in the art within the principle and scope of the invention as expressed in the appended claims.

Having thus described the subject matter of the invention what it is desired to secure by Letters Patent is:

1. Process for the production of a viscose solution useful in the production of rayon fiber, rayon cord, cellophane and the like that comprises:
  (a) preparation of a cellulosic pulp from microcelled grain parchment materials yielding a near pure substantially undegraded cellulosic pulp substantially free of lignin and pentosans by steps which comprise (1) a pretreatment step employing in solution approximately 1–2 percent sulfuric acid by weight with reference to raw material at a temperature of approximately 150° C. (2) washing said pulp (3) filtering said pulp (4) a 15 to 30 minute digestion step employing in solution approximately 12 to 18 percent alkali and 30 to 40 percent sulfidity at a temperature of approximately 165° C. (5) washing said pulp (6) filtering said pulp (7) a multistage chlorine bleaching step wherein from 40 to 65 percent of consumed chlorine is supplied as chlorine dioxide and includes purification with concentrated sodium hydroxide solution prior to the final chlorine dioxide stage and (8) drying the pulp so produced;
  (b) steeping and pressing the pulp in the conventional manner;
  (c) macerating the pulp for a brief period only;
  (d) in the absence of any aging proceeding with xanthation, mixing, filtration, degassing and ripening, whereby a viscose solution is produced.

2. Process for the production of a viscose solution useful in the production of rayon fiber, rayon cord, cellophane and the like from a micro-celled grain parchment material that is substantially undegraded cellulose pulp substantially free of lignin and pentosans that comprises:
  (a) a pretreating step employing in solution approximately 1–2 percent acid by weight with reference to raw material at a temperature of approximately 150° C.; washing said pulp; filtering said pulp;
  (b) a 15–30 minutes digestion step employing in solution approximately 12–18 percent alkali and 30–40 percent sulfidity at a temperature of approximately 165° C.; washing said pulp; filtering said pulp;
  (c) a multistage chlorine bleaching step wherein from 40 to 65% of consumed chlorine is supplied as chlorine dioxide, and including purification with concentrated sodium hydroxide approximately 150 percent by weight with respect to pulp solution prior to the final chlorine dioxide stage;
  (d) drying the pulp so produced;
  (e) steeping the pulp at a concentration of 220 grams per liter;
  (f) pressing the steeped pulp;
  (g) macerating the pressed pulp for a period of about 15 minutes at a temperature of about 5°–8° C.;
  (h) xanthating the macerated pulp, employing 40 percent $CS_2$ by weight with reference to cellulose and under vacuum conditions;
  (i) mixing the xanthated material so as to produce a solution containing about 6 percent cellulose and 6 percent sodium hydroxide, said mixing being carried out at about 5° C.;
  (j) filtering the mixed solutions;
  (k) degassing the filtrate; and
  (l) ripening the solution for about 48 hours.

3. In a process for the production of a viscose solution from cellulosic pulp that comprises the steps of steeping, pressing, maceration, aging, xanthation, mixing, filtration, degassing and ripening, the improvements that comprise:
  (a) preparing a cellulosic pulp from microcelled grain parchment materials yielding a near pure substantially undegraded cellulosic pulp substantially free of lignin and pentosans by steps which comprise (1) a pretreatment step employing in solution approximately 1-2 percent sulfuric acid by weight with reference to raw material at a temperature of approximately 150° C. (2) washing said pulp (3) filtering said pulp (4) a 15 to 30 minute digestion step employing in solution approximately 12 to 18 percent alkali and 30 to 40 percent sulfidity at a temperature of approximately 165° C. (5) washing said pulp (6) filtering said pulp (7) a multistage chlorine bleaching step wherein from 40 to 65 percent of consumed chlorine is supplied as chlorine dioxide and includes purification with concentrated sodium hydroxide solution prior to the final chlorine dioxide and (8) drying the pulp so produced;

(b) macerating the pressed material for a brief period only and at a temperature of about 5°–8° C.;

(c) proceeding directly with xanthation and the remaining steps without any intermediary aging.

References Cited

UNITED STATES PATENTS

| | | | |
|---|---|---|---|
| 295,835 | 3/1884 | Teter | 162—99 |
| 1,548,864 | 8/1925 | Brandenberger. | |
| 1,570,389 | 1/1926 | Morgenier | 162—99 X |
| 1,989,424 | 1/1935 | Osgood et al. | 260—217 X |
| 2,140,863 | 12/1938 | Sunesson | 260—124 XR |
| 2,153,316 | 4/1939 | Sherrard et al. | 260—124 XR |
| 2,156,159 | 4/1939 | Olsen et al. | 260—124 |
| 2,615,883 | 10/1952 | Sweeney et al. | 260—212 XR |
| 2,924,547 | 2/1960 | Knapp et al. | 162—99 X |
| 2,962,413 | 11/1960 | Hatheway | 162—99 X |
| 3,052,593 | 9/1962 | Battista. | |

OTHER REFERENCES

"Industrial Utilization of the Coffee Plant," Araujo et al., News Edition, Am. Chem. Soc. (Chem. & Eng. News), vol. 19, No. 16. pp. 877–881, August 21, 1941.

ALEXANDER H. BRODMERKEL, *Primary Examiner.*

J. H. WOO, *Assistant Examiner.*